United States Patent
Meyer et al.

(10) Patent No.: US 8,150,722 B2
(45) Date of Patent: Apr. 3, 2012

(54) SYSTEM AND METHOD FOR AUTOMATED PROCESSING OF CLAIMS

(75) Inventors: Douglas Clifford Meyer, Morton, IL (US); Darrel Wayne Haynes, Morton, IL (US); Matthew Steven Kaag, Peoria, IL (US); Joshua Willis Green, Washington, IL (US); Donna Louise Vogel, Tremont, IL (US)

(73) Assignee: Caterpillar Inc., Peoria, IL (US)

( * ) Notice: Subject to any disclaimer, the term of this patent is extended or adjusted under 35 U.S.C. 154(b) by 1250 days.

(21) Appl. No.: 11/882,276

(22) Filed: Jul. 31, 2007

(65) Prior Publication Data
US 2009/0037250 A1   Feb. 5, 2009

(51) Int. Cl.
*G06F 9/46* (2006.01)
(52) U.S. Cl. ..................................................... 705/7.29
(58) Field of Classification Search ............. 705/7, 7.29, 705/4
See application file for complete search history.

(56) References Cited

U.S. PATENT DOCUMENTS

| | | |
|---|---|---|
| 5,359,509 A | 10/1994 | Little et al. |
| 5,870,711 A | 2/1999 | Huffman |
| 6,499,657 B1 | 12/2002 | van Abeelen et al. |
| 6,606,031 B2 | 8/2003 | Olson |
| 6,826,536 B1 | 11/2004 | Forman |
| 7,124,112 B1 | 10/2006 | Guyan et al. |
| 7,356,460 B1* | 4/2008 | Kennedy et al. .............. 704/9 |
| 2002/0035488 A1* | 3/2002 | Aquila et al. .............. 705/4 |
| 2002/0099590 A1 | 7/2002 | Abate et al. |
| 2004/0064345 A1* | 4/2004 | Ajamian et al. .............. 705/4 |
| 2004/0078247 A1* | 4/2004 | Rowe et al. .............. 705/4 |
| 2005/0055287 A1 | 3/2005 | Schmidtberg et al. |
| 2005/0228699 A1 | 10/2005 | Samuels et al. |
| 2007/0027725 A1 | 2/2007 | Dirnberger et al. |

FOREIGN PATENT DOCUMENTS

WO     WO2004023238     *   3/2004

* cited by examiner

*Primary Examiner* — Romain Jeanty
(74) *Attorney, Agent, or Firm* — Finnegan, Henderson, Farabow, Garrett & Dunner LLP

(57) ABSTRACT

A system and method are disclosed that provide for processing claims. The system and method include receiving a claim from a customer and determining if a customer average value associated with the customer is greater than or equal to a threshold value. The system and method also include processing the claim when the customer average value is less than the threshold value and determining if the claim meets one or more predetermined parameters when the customer average value is greater than or equal to the threshold value. In addition, the system and method include processing the claim when the claim meets the one or more predetermined parameters and forwarding the claim for further investigation when the claim fails to meet the one or more predetermined parameters and the customer average value is greater than or equal to the threshold value.

17 Claims, 4 Drawing Sheets

SYSTEM AND METHOD FOR AUTOMATED PROCESSING OF CLAIMS

TECHNICAL FIELD

The present disclosure relates generally to a system and method for processing claims, and more particularly, to a system and method for automated processing of product claims.

BACKGROUND

During the course of business, product distributors may deal with claims from customers who purchase their products. A claim may be submitted to the product distributor by the customer when the customer determines that a quantity and/or type of product received from the product distributor is not the same as the quantity and/or type of products ordered from the product distributor. For example, a claim may indicate that none of the ordered products were received (e.g., "zero-fill"), too many products were received (e.g., overage), too few products were received (e.g., shortage), the product received was not the product ordered (e.g., wrong product), one or more component products of a group of products was missing (e.g., incomplete groups), etc.

When a claim is submitted to the product distributor, the product distributor may make a determination on the merits of the claim and, in some instances, generate a correction. The correction may include, for example, credits and/or debits against the amount due either in whole or in part, return of one or more products by the claimant, providing one or more products to the claimant, etc.

Systems and methods have been created to capture, evaluate, and fulfill line item claims. One such example is U.S. Pat. No. 7,124,112 (the '112 patent) to Guyan et al., granted on Oct. 17, 2006. The '112 patent discloses a data processing system for evaluating line item data. In the '112 patent, an insurance host server provides line item data to a claim handler client for evaluation, and receives evaluation information from the claim handler.

Although the system and method of the '112 patent may be capable of claims processing, the system and method do not offer a way to automatically process one or more claims based on a customer's claim history as well as the claim. In addition, the system and method of the '112 patent do not provide a way to improve claim processing efficiency for those claimants whose claim history falls within one or more predetermined thresholds. Nor does the system and method of the '112 patent identify an improvement plan associated with those claimants whose claim history exceeds of one or more predetermined thresholds. Thus, the system of the '112 patent does not offer a way to provide claimants with information regarding process improvement associated with supply chain management. The system and method of the '112 patent also fails to offer a way to reduce the number of claims and their associated costs and improving the efficiency of claims processing.

The disclosed system is directed to overcoming one or more of the problems set forth above.

SUMMARY OF THE INVENTION

In one aspect, the present disclosure is directed to a method and a computer-readable medium including instructions for performing a method, when executed by a processor, for processing claims. The method includes receiving a claim from a customer and determining if a customer average value associated with the customer is greater than or equal to a threshold value. The method also includes processing the claim when the customer average value is less than the threshold value and determining if the claim meets one or more predetermined parameters when the customer average value is greater than or equal to the threshold value. In addition, the method includes processing the claim when the claim meets the one or more predetermined parameters. The method further includes forwarding the claim for further investigation when the claim fails to meet the one or more predetermined parameters and the customer average value is greater than or equal to the threshold value.

In another aspect, the present disclosure is directed to a method for processing claims. The method receives a claim from a customer, where the customer has an associated customer average value, and determines if the customer average value is greater than or equal to a threshold value. The threshold value is based on a group average value associated with a group of customers, and the customer is included in the group of customers. In addition, the method processes the claim when the customer average value is less than the threshold value.

DETAILED DESCRIPTION

Figure 1:
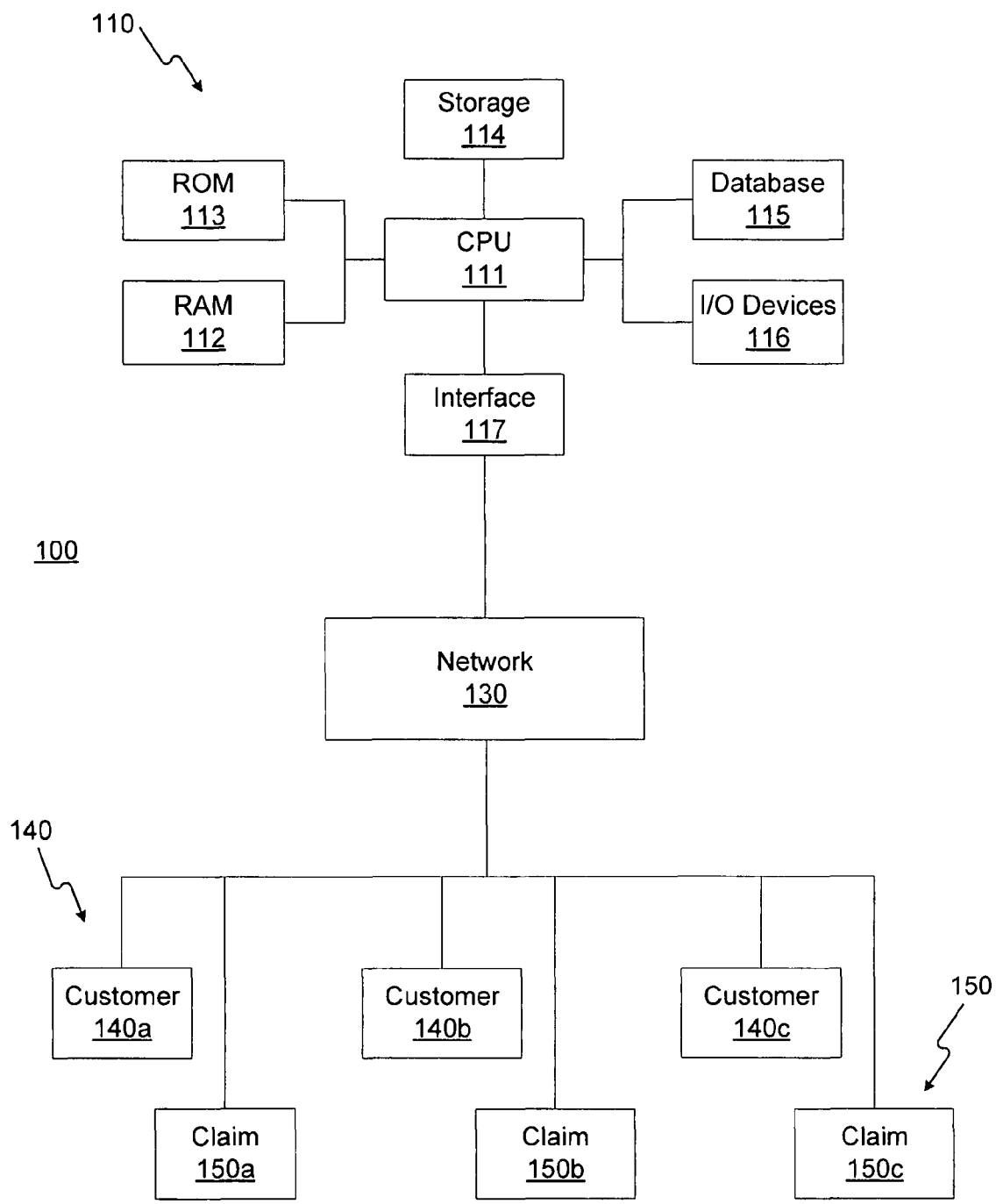
FIG. 1 is a block diagram of an exemplary system architecture, consistent with certain disclosed embodiments.

FIG. 1 illustrates an exemplary system architecture 100 in which principles and methods consistent with the disclosed embodiments may be implemented. As shown in FIG. 1, system architecture 100 may include one or more hardware and/or software components configured to collect, monitor, store, analyze, evaluate, distribute, report, process, record, and/or sort information associated with automated processing of customer claims. For example, system architecture 100 may include claim management computing system 100, network 130, customers 140, and claims 150.

Claim management computing system 110 may include one or more hardware and/or software components such as, for example, a central processing unit (CPU) 111, a random access memory (RAM) module 112, a read-only memory (ROM) module 113, a storage 114, a database 115, one or more input/output (I/O) devices 116, and an interface 117. Claim management computing system 110 may be configured to receive, collect, analyze, evaluate, report, display, and distribute data related to the automated processing of customer claims, and may use one or more software components or applications. For example, claim management computing system 110 may be configured to manage and track customer and product data, including customer claim data in relation to one or more products, and perform automated processing of customer claims based on that data. Claim management computing system 110 may be, for example, a mainframe, a server, a desktop, a laptop, and the like.

CPU 111 may include one or more processors, each configured to execute instructions and process data to perform functions associated with claim management computing system 110. As illustrated in FIG. 1, CPU 111 may be connected to RAM 112, ROM 113, storage 114, database 115, I/O devices 116, and interface 117. CPU 111 may be configured to execute computer program instructions to perform various processes and methods consistent with certain disclosed embodiments. The computer program instructions may be loaded into RAM 112 for execution by CPU 111.

RAM 112 and ROM 113 may each include one or more devices for storing information associated with an operation of claim management computing system 110 and/or CPU 111. For example, ROM 113 may include a memory device configured to access and store information associated with claim management computing system 110, including information for identifying, initializing, and monitoring the operation of one or more components and subsystems of claim management computing system 110. RAM 112 may include a memory device for storing data associated with one or more operations performed by CPU 111. For example, instructions from ROM 113 may be loaded into RAM 112 for execution by CPU 111.

Storage 114 may include any type of storage device configured to store any type of information used by CPU 111 to perform one or more processes consistent with the disclosed embodiments. For example, storage 114 may include one or more magnetic and/or optical disk devices, such as hard drives, CD-ROMs, DVD-ROMs, or any other type of media storage device.

Database 115 may include one or more software and/or hardware components that store, organize, sort, filter, and/or arrange data used by claim management computing system 110 and/or CPU 111. Database 115 may include a relational, distributed, or any other suitable database format. A relational database may be in tabular form where data may be organized and accessed in various ways. A distributed database may be dispersed or replicated among different locations within a network. For example, database 115 may store historical information such as dealer purchasing, return, and claim history, product data, product sales data, and the like, associated with the management, tracking, and forecasting of product sales and claim data, or any other information that may be used by CPU 111 to perform automated processing of customer claims. Database 115 may also include one or more analysis tools for analyzing information within the database. Database 115 may store additional and/or different information than that listed above.

I/O devices 116 may include one or more components configured to communicate information with a user associated with claim management computing system 110. For example, I/O devices 116 may include a console with an integrated keyboard and mouse to allow a user to input parameters associated with claim management computing system 110 and/or data associated with automated processing of claims 150. I/O devices 116 may also include a user-accessible disk drive (e.g., a USB port, a floppy, CD-ROM, or DVD-ROM drive, etc.) to allow a user to input data stored on a portable media device. Additionally, I/O devices 116 may include one or more displays or other peripheral devices, such as, for example, a printer, a camera, a microphone, a speaker system, an electronic tablet, or any other suitable type of input/output device.

Interface 117 may include one or more components configured to transmit and/or receive data via network 130. In addition, interface 117 may include one or more modulators, demodulators, multiplexers, de-multiplexers, network communication devices, wireless devices, antennas, modems, and any other type of device configured to enable data communication via any suitable communication network. It is further anticipated that interface 117 may be configured to allow CPU 111, RAM 112, ROM 113, storage 114, database 115, and one or more input/output (I/O) devices 116 to be located remotely from one another and perform the collection, analysis, and distribution of data or other information.

Claim management computing system 110 may include additional, fewer, and/or different components than those listed above and it is understood that the listed components are exemplary only and not intended to be limiting. For example, one or more of the hardware components listed above may be implemented using software. For example, storage 114 may include a software partition associated with one or more other hardware components of return management computing system 110. Additional hardware or software may also be required to operate claim management computing system 110, such as, for example, security applications, authentication systems, dedicated communication system, etc. The hardware and/or software may be interconnected and accessed as required by authorized users. In addition, a portion, or all of, claim management computing system 110 may be hosted and/or operated by a third party.

As discussed above, computer system may be in communication with network 130 by means of interface 117. Network 130 may be any appropriate communication network allowing communication between or among one or more entities. Network 130 may include, for example, the Internet, a local area network, a workstation peer-to-peer network, a direct link network, a wireless network, or any other suitable communication platform. Connection with network 130 may be wired, wireless, or any combination thereof.

Customers 140a, 140b, and 140c may each represent an end customer, dealer, wholesaler, merchant, retailer, vendor, reseller, or other type of entity authorized to conduct transactions using the disclosed embodiments. Customers 140 may include primary customers 140 (e.g., primary dealers in a resale environment, end customer in a direct sales environment, etc.), secondary customers 140 (e.g., secondary dealers in a resale environment, end customer in a resale environment, etc.), and the like. Customers 140 may connect to network 130 using any suitable computing device, such as, for example a desktop computer, a laptop computer, a mainframe computer, a client device, a handheld computing device, a telephone, etc. The connection between customers 140 and network 130 may be through any wired or wireless means.

Claims 150a, 150b, and 150c may each represent a claim associated with one or more products. As discussed above, a claim may be a notification to the product distributor from customer 140 requesting correction of an amount due under the terms of an implied or written agreement. Settlement of a claim may include credits and/or debits against the amount due either in whole or in part, return of one or more products by the claimant, providing one or more products to the claimant, etc. In one exemplary embodiment, product claims may be put into categories, such as, for example, zero-fill (e.g., none of the ordered products were received), overage (e.g., too many products were received), shortage (e.g., too few products were received), wrong product (e.g., the product received was not the product ordered), incomplete groups (e.g., one or more component products of a group of products was missing), etc. In some embodiments, claims 150 may each be submitted to a product distributor by customers 140.

Products may refer to any type of service or good. Products may include, for example, consumer goods, raw materials, production goods, whole products, parts, assemblies, sub-assemblies, components, sub-components, etc. Other, non-limiting examples of products may include, for example, manufactured or manufacturing components, manufactured or manufacturing products, automobiles, water-craft (i.e., boats, ships, etc.), machines, machinery, automotive or machinery parts and supplies, engines, engine parts and supplies, commercial products, office supplies, commercial goods including retail and/or wholesale goods, etc. In addition, products may also include, for example, personal and/or professional services, medical services, insurance services, etc.

Figure 2:
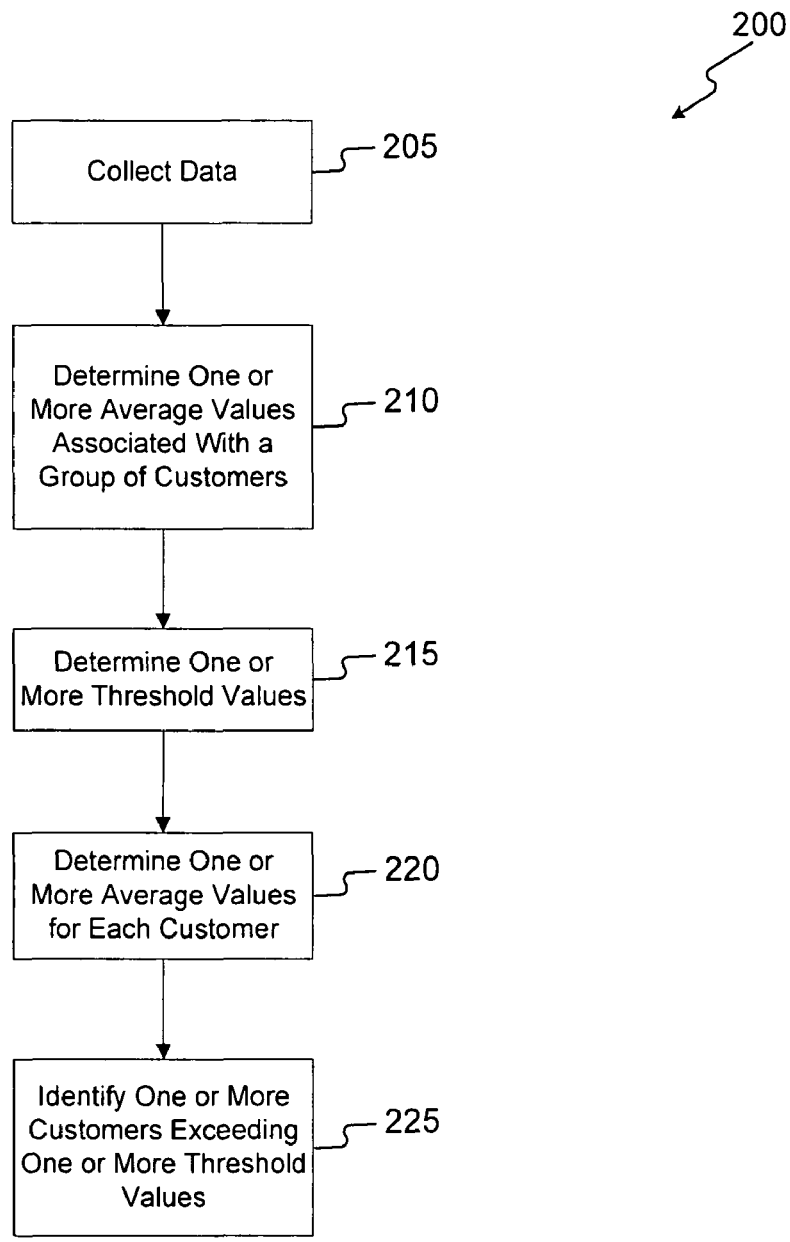
FIG. 2 is a flow chart illustrating an exemplary process for determining one or more parameters associated with claim processing, consistent with certain disclosed embodiments.

FIG. 2 illustrates a flowchart 200 of an exemplary process for determining one or more parameters associated with claim processing, consistent with certain disclosed embodiments. In one embodiment, the process of FIG. 2 may be performed by claim management computing system 110. For example, claim management computing system 110 may execute one or more software programs that perform one or more of the process steps shown in FIG. 2.

In one exemplary embodiment, a product distributor may utilize claim management computing system 110 to perform the method of the disclosed embodiment. Claim management computing system 110 may be owned, operated, and/or supported, either in whole or in part, by the product distributor. Furthermore, claim management computing system 110 may be located in a facility or property owned, operated, and/or supported, either in whole or in part, by a product distributor. Alternatively and/or additionally, claim management computing system 110 may be owned, operated, and/or supported, either in whole or in part, by a claim management computing entity, and claim management computer system 110 may receive, collect, store, analyze, evaluate, report, display and distribute data consistent with the certain disclosed embodiments. A claim management computing entity may be, for example, a business or other organization configured to perform automated processing of claims on behalf of a product distributor consistent with certain disclosed embodiments. A product distributor may be any entity performing the task of distributing products or providing services to another entity, such as, for example, one or more customers, dealers, wholesalers, merchants, authorized resellers, etc. The product distributor may include, for example, a product designer, a product manufacturer, a product warehouse, a product supplier, etc. In addition, the products may be utilized in assembled product, and the product distributor may be an assembled product designer, an assembled product manufacturer, an assembled product warehouse, an assembled product supplier, etc.

Claim management computing system 110 may collect data associated with one or more customers 140 and/or claims 150 (step 205), and store the data in database 115. For example, database 115 may store a customer name, customer address, customer contact information, historical order information for each customer 140, historical claim information for each customer 140, etc. Historical order information may include, for example, one or more product orders, one or more types of orders, frequency of orders, etc. Historical claim information may include, for example, number of claims, cost of claims, identity of claim originator, reason for each claim, frequency of claims, etc. As used herein, "order" may include the request to purchase, the purchase, and/or the shipment of one or more products.

Claim management computing system 110 may determine one or more average values associated with a group of customers 140 (step 210). One or more average values may include, for example, an average number of claims per order for the group of customers 140, an average number of claims 150 per group of customers 140, an average number of claims 150 per number of products ordered, etc. In one exemplary embodiment, claim management computing system 110 may evaluate a group of customers 140 and claims 150 to determine a mean average number of claims per 10,000 products ordered for a group of customers 140. In one embodiment, a mean average value may be determined by adding up the numbers in a sample and dividing that answer by the sample size. In some embodiments, the mean average value may be referred to as the sample average.

A group of customers 140 may consist of, for example, one or more customers 140 evaluated as a group. Customers 140 may be grouped according to a size of customer 140 (e.g., number of employees, market value of customer 140, etc.), objective and/or subjective value of customer 140 to the product distributor (e.g., future value, present value, subjective value, objective value, etc.), a volume of orders from customer 140, a sales relationship between customer 140 and the product distributor (e.g., parent dealer, child dealer, etc.), and the like. In one exemplary embodiment, the group of customers 140 may include every customer 140.

Alternatively and/or additionally, claim management computing system 110 may evaluate one or more customers 140 and claims 150 to determine one or more average values associated with customer 140 in relationship to one or more categories of products. For example, claim management computing system 110 may categorize one or more claims 150 according to one or more categories of products based on certain data, such as, for example, types of products, a sales volume of one or more products, and/or value of the one or more products. Claim management computing system 110 may evaluate one or more customers 140 and one or more claims 150 to determine an average number of claims 150 per customer 140 within each of the one or more predetermined categories of products.

Claim computing management system 110 may determine one or more threshold values (step 215). The one or more threshold values may be associated with the determined average. In one exemplary embodiment, the one or more threshold values may be multiples of a standard deviation from the determined mean average (e.g., 1σ, 2σ, 3σ, 4σ, etc.). The standard deviation may be calculated using any suitable formula, as is known in the art. For example, claim management computing system 110 may use Eq. 1 below to calculate the standard deviation.

$$\sigma(r) = \sqrt{\frac{1}{N}\sum_{i=1}^{N}(x_i - r)^2} \qquad \text{Eq. 1}$$

where:
σ(r) is the Standard Deviation;
N is the Sample Size;
$x_i$ is the Value of Each Sample; and
r is the Sample Mean.

Once claim management computing system 110 determines an average and one or more threshold values, claim management computing system 110 may calculate one or more average values for each customer 140 (step 220). One or more average values for each customer 140 may include, for example, an average number of claims per order for that customer 140, an average number of claims 150 for that customer 140, an average number of claims 150 per number of products ordered by that customer 140, etc. In one exemplary embodiment, claim management computing system 110 may determine a mean average number of claims per 10,000 products ordered by that customer 140. For instance, claim management computing system 110 may compute a mean average value by adding up the numbers in a sample and dividing that answer by the sample size.

Claim management computing system 110 may then identify one or more customers 140 that exceed a pre-determined one or more threshold values (step 225). For example, using the data calculated in step 210, 215, and 220, claim management computing system 110 may identify one or more customers 140 greater than or equal to a threshold value of $3\sigma$. Alternatively and/or additionally, claim management computing system 110 may identify one or more customers 140 falling within the range of greater than or equal to $2\sigma$ and less than $3\sigma$, greater than or equal to $1\sigma$ and less than $2\sigma$, etc. Claim management computing system 110 may store this information in database 115 for further processing consistent with certain disclosed embodiments.

Claim management computing system 110 may perform the steps of flowchart 200 periodically. In some embodiments, claim management computing system 110 may be configured to automatically evaluate and/or re-evaluate the data at predetermined periods of time (e.g., annually, biennially, semiannual, quarterly, monthly, weekly, daily, etc.). In one exemplary embodiment, claim management computing system 110 may evaluate the data on a quarterly basis. Alternatively and/or additionally, the data may be evaluated and/or re-evaluated based on a predetermined event (e.g., regularly scheduled time intervals, specified number of claims, claims for items having a specified dollar amount, sales volume, and/or velocity [i.e., rate at which an item is sold], etc.). In another embodiment, claim management computing system 110 may process a list of claim records when one or more claims are received and/or processed. Alternatively and/or additionally, claim management computing system 110 may process a list of claims 150 when prompted, requested, instructed, or otherwise directed by an authorized user. In addition, claim management computing system 110 may include every claim initiated during a predetermined period of time (e.g., annually, biennially, semiannual, quarterly, monthly, weekly, daily, etc.). In one exemplary embodiment, claim management computing system 110 may include every claim initiated during a quarter.

For example, customers 140a, 140b, and 140c may each submit a plurality of claims 150 to claim management computing system 110. Claim management computing system 110 may, at the end of each quarter, determine a mean average number of claims per 10,000 items ordered for the group consisting customers 140a, 140b, and 140c during the quarter. Claim management computing system 110 may also determine a standard deviation for the group of customers 140 in relation to the mean average for the quarter. In addition, claim management computing system 110 may determine an average number of claims per 10,000 items ordered for each customer 140a, 140b, and 140c, and compare the average of each customer 140a, 140b, and 140c to the threshold values defined by multiples of the standard deviation (i.e., $1\sigma$, $2\sigma$, $3\sigma$, $4\sigma$, etc.). In this example, claim management computing system 110 may determine that customer 140a is within $1\sigma$, customer 140b is within $2\sigma$, and customer 140c exceeds $3\sigma$. Thus, claim management computing system 110 may generate and store a flag or other indicator against customer 140c in database 115, indicating that an average value for customer 140c exceeds the predefined threshold value.

Figure 3:
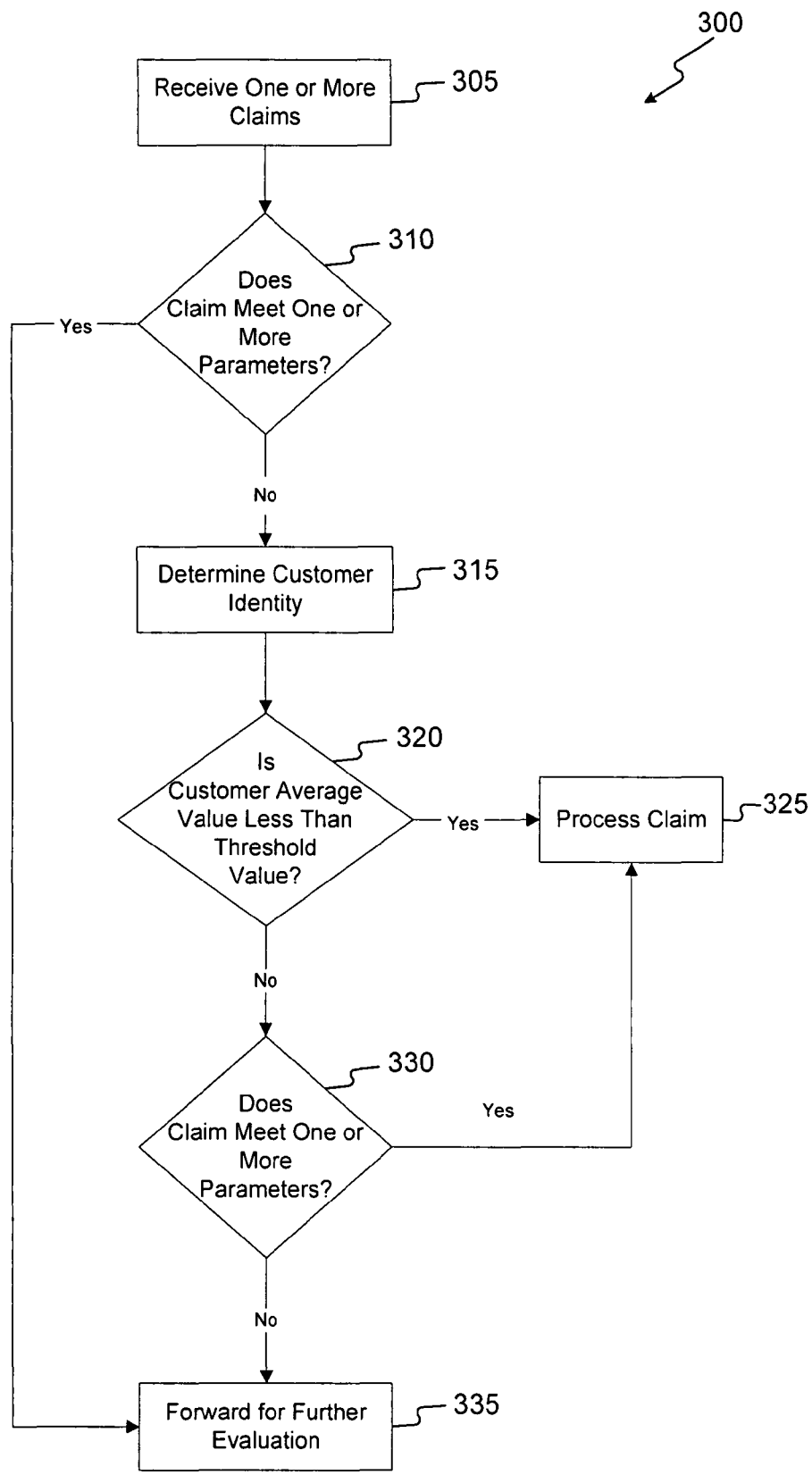
FIG. 3 is a flow chart illustrating an exemplary process for processing a claim, consistent with certain disclosed embodiments.

FIG. 3 illustrates a flowchart 300 of an exemplary process for evaluating one or more claims associated with claim processing, consistent with certain disclosed embodiments. The process of FIG. 3 may be performed by claim management computing system 110. For example, claim management computing system 110 may execute software that performs one or more of the process steps shown in FIG. 3. In one embodiment, a product distributor may utilize claim management computing system 110 to perform the method of the disclosed embodiment.

Claim management computing system 110 may receive one or more claims 150 from customer 140 (step 305). Claim 150 may be submitted to claim management computing system 110 for processing by any means of transferring information including, but not limited to, mail, courier, hand-delivery, and/or electronically. In one exemplary embodiment, claim 150 may be submitted electronically, e.g., Electronic Data Interchange (EDI), email, Website, etc. Claim 150 may include parameters, such as, for example, customer name, customer contact information, one or more product numbers and/or quantities, a claim date, dealer information, dealer type (e.g., primary dealer, secondary dealer, dealer group, etc.), and the like.

Upon receipt of claim 150, claim management computing system 110 may evaluate claim 150 to determine if claim 150 meets one or more parameters (step 310). If the received claim 150 meets one or more predetermined parameters (step 310, Yes), claim management computing system 110 may forward the claim for further processing (step 335). In one exemplary embodiment, the one or more parameters may be predetermined. The one or more parameter may include, for example, a type of product (e.g., sensitive products (i.e., products that are subject to security controls and/or mechanisms), controlled products, engines, etc.), value of product (e.g., high value products, etc.), etc. In one exemplary embodiment, if claim 150 is for a sensitive product (step 310, Yes), claim management computing system 110 may automatically forward claim 150 for further evaluation (step 335). In another exemplary embodiment, if claim 150 is for an engine (step 310, Yes), claim management computing system 110 may again automatically forward claim 150 for further evaluation (step 335).

If the received claim 150 does not meet one or more parameters (step 310, No), claim management computing system 110 may determine the identity of customer 140 submitting claim 150 (step 315). Claim management computing system 110 may determine the identity of customer 140 by data contained in claim 150 or submitted in connection with claim 150. In one exemplary embodiment, claim management computing system 110 may access database 115 to verify the identity of customer 140.

Claim management computing system 110 may access database 115 to determine if an average value associated with customer 140 (e.g., average claim amount, average number of claims, etc.) is less than one or more predetermined threshold values (step 320). For example, claim management computing system 110 may automatically access database 115 to determine if an average value associated with customer 140 is greater than or equal to a predetermined threshold value, as discussed in connection with step 215 of FIG. 2. In one exemplary embodiment, claim management computing system 110 may determine if an average value associated with customer 140 is greater than or equal to a threshold value of $3\sigma$. Alternatively and/or additionally, claim management computing system 110 may determine if an average value associated with customer 140 is within the range of greater than or equal to $2\sigma$ and less than $3\sigma$, greater than or equal to $1\sigma$ and less than $2\sigma$, etc.

If claim management computing system 110 determines that the customer's average value is less than a predetermined threshold value (step 320, Yes), claim management computing system 110 may automatically process the received claim 150 (step 325). Automatically processing the received claim 150 may include, for example, automatically authorizing one or more products to be sent to customer 140, automatically authorizing the receipt of one or more products from customer 140 into inventory, automatically issuing a credit to customer 140, automatically debiting an account associated with customer 140, etc. Data associated with the amount of credit or debit and/or method of credit or debit issuance may be found in database 115 of claim management computing system 110. In one embodiment, credit or debit may be determined and/or issued by claim management computing system 110. For example, claim management computing system 110 may determine that a claim has been received, processed, approved, and that a credit is due. In some embodiments, credit or debit may be determined and/or issued by the product distributor. Alternatively and/or additionally, claim management computing system 110 may forward the credit or debit data to another entity for further processing. The entity may include, for example, an accountant or accounting group, a bank or financial institution, etc. In some embodiments, the entity may be associated with the product distributor. Credits or debits may be issued by any means known in the art, such as, for example, check, electronic funds transfer, account credit, product coupons, product credit, etc.

If claim management computing system 110 determines that an average value for customer 140 is greater than or equal to the predetermined threshold value (step 320, No), claim management computing system 110 may evaluate claim 150 to determine if claim 150 meets one or more parameters (step 330). If the received claim 150 meets one or more parameters (step 330, Yes), claim management computing system 110 may automatically process claim 150 (step 320). In one exemplary embodiment, the one or more parameters may be predetermined. The one or more parameter may include, for example, a type of claim, quantity of products associated with claim 150, value of claim 150, etc. In one exemplary embodiment, if claim 150 is an overage claim (i.e., customer 140 receives more products than ordered) or if claim 150 is a wrong product (i.e., customer 140 receives a product different than that ordered), claim management computing system 110 may automatically process claim 150. For example, if claim 150 is for a product valued at $150 and the one or more predetermined parameters include any product valued at less than $50, claim 150 may not meet the one or more parameters and claim management computing system 110 may forward the claim for further evaluation. In another exemplary embodiment, if claim 150 is for an incomplete group of items and the dollar amount of the missing item is low, claim management computing system 110 may again automatically process the claim.

Alternatively and/or additionally, the one or more parameters may be determined dynamically. In one exemplary embodiment, claim management computing system 110 may store historical information and may be configured to detect trends in claim processing. For example, if claim management computing system 110 receives multiple claims 150 for the same or similar items, claim management computing system 110 may automatically forward the duplicate claim 150 or any subsequent claims 150 for further evaluation.

If claim management computing system 110 determines that the claim does not meet one or more parameters (step 330, No), claim management computing system 110 may forward claim 150 for further processing (step 335). For example, claim management computing system 110 may forward claim 150 to one or more adjusters, auditors, and the like for further evaluation. The one or more adjusters, auditors, and the like may, upon evaluation of claim 150, determine to process claim 150 or deny claim 150. In addition, the one or more adjusters, auditors, and the like may initiate processes for improving one or more average values for customer 140, thereby bringing customer 140 within the one or more threshold values. Additionally and/or alternatively, claim management computing system 110 may forward claim 150 to a system, component, software program, etc. that automatically evaluates the claim according to rules, criteria, etc. For example, claim management computing system 110 may send claim 150 to an expert system (not shown) for evaluating claim 150. Other types of evaluation processes or systems may be implemented as well.

For example, claim management computing system 110 may receive claim 150a from customer 140*a*, claim 150b from customer 140*b*, and claim 150c from customer 140*c*. Upon receipt of each claim 150, claim management computing system 110 may determine the identity of the customer 140 submitting the claim, and access database 115. Claim management computing system 110 may determine, from the data stored in database 115, if any of customers 140*a*, 140*b*, or 140*c* have an average customer value equal to or greater than the predetermined threshold value. In this example, as discussed above in connection with FIG. 2, the predetermined threshold value may be 3, claim management computing system 110 may determine that customer 140*c* has an average customer value equal to or greater than the predetermined threshold value, whereas customers 140*a* and 140*b* have average values less than the predetermined threshold value. Thus, upon receipt of claim 150a from customer 140*a* and claim 150b from customer 140*b*, claim management computing system 110 may automatically process claims received from customers 140*a* and 140*b*. However, because customer 140*c* has an average value greater than the predetermined threshold value, claim management computing system 110 may evaluate claim 150c further to determine if it meets one or more predetermined parameters. In this example, claim 150c may be a shortage claim (i.e., not all the products ordered are received), and claim 150c may not meet the one or more predetermined parameters. Thus, claim management computing system 110 may forward claim 150c for further processing.

Figure 4:
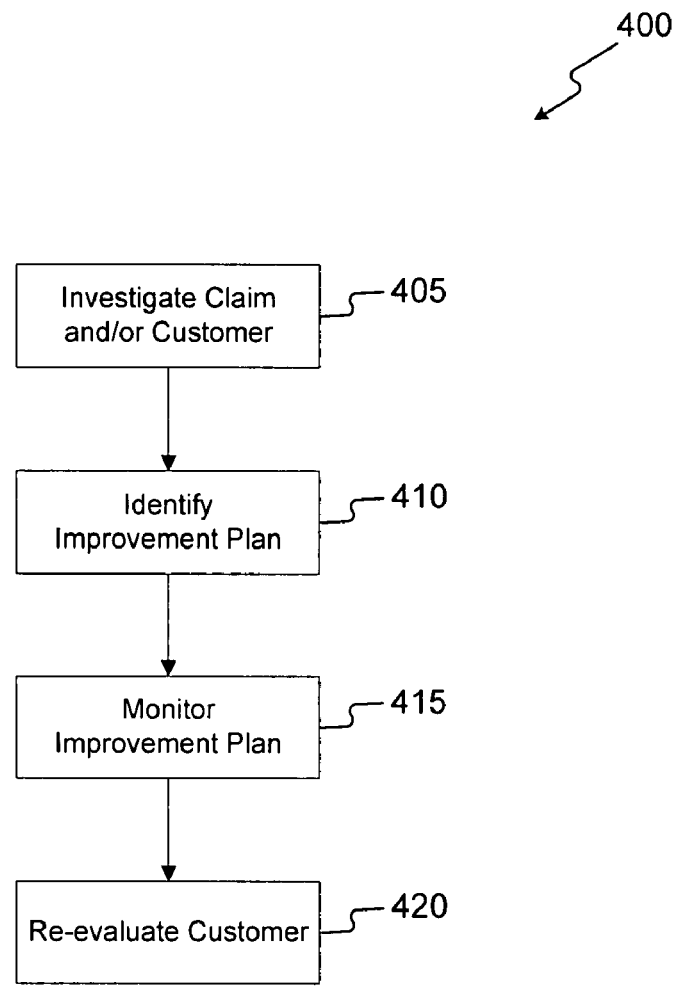
FIG. 4 is a flow chart illustrating an exemplary process for improving customer claim statistics, consistent with certain disclosed embodiments.

FIG. 4 illustrates a flowchart 400 of an exemplary process for improving one or more average values for customer 140, consistent with certain disclosed embodiments. Claim management computing system 110 may initiate an investigation into claim 150 and/or customer 140 (step 405). An investigation may be automatically initiated upon a determination to forward claim 150 for further processing, as discussed above in connection with step 335 of FIG. 3. Alternatively and/or additionally, an investigation may be automatically initiated upon a determination that an average value associated with customer 140 exceeds one or more predetermined threshold values, as discussed above in connection with step 225 of FIG. 2. Investigation may include analysis of one or more processes associated with customer 140, and may include, for example, evaluation of one or more shipping processes, evaluation of one or more receiving processes, evaluation of one or more third-parties (e.g., shippers, etc.), and the like. An investigation may be conducted by one or more adjusters, auditors, and the like using the data stored in claim management computing system 110.

An improvement plan associated with customer 140 may be identified (step 410). The improvement plan may include generating one or more new processes, such as, for example, one or more new receiving processes, one or more new shipping processes, increased auditing prior to shipping products to customer 140, increased communication with customer 140, etc. For example, claim management computing system 110 may initiate increased auditing by the product distributor, such as, for example, auditing every shipment to customer 140, etc. As another example, the product distributor may evaluate one or more customer processes, such as, for example, reviewing one or more receiving processes, review and/or training of employees of customer 140, etc. In addition, customer 140 may be requested to contact the product distributor to discuss the details of claim 150 prior to submission.

Following implementation of the improvement plan, claim management computing system 110 may monitor the results of the improvement plan (step 415). Monitoring the results may include, for example, monitoring the number of claims 150 filed by customer 140, recalculating an average value of claims 150 filed by customer 140, re-evaluating one or more processes of customer 140, reviewing results of auditing by product distributor, etc.

Claim management computing system 110 may periodically re-evaluate the status of customer 140 (step 420). For example, claim management computing system 110 may re-calculate an average value of claims filed by customer 140, re-calculate an average value associated with a group of customers 140, etc. In one exemplary embodiment, claim management computing system 110 may re-evaluate customer 140 by repeating the steps discussed above in connection with FIG. 2. That is, claim management computing system 110 may automatically access database 115 to evaluate data, such as, for example, customer purchasing and claim history, product data, product sales data, and the like. Claim management computing system 110 may calculate a new average value associated with a group of customers 140, determine one or more threshold values related to the new average value, and calculate a new average value for each customer 140.

In one exemplary embodiment, the claim processing may be fully automated by claim management computing system 110 and may require some or no user interaction. For example, software processes may determine receive claim 150, process claim 150, and generate one or more reports. In one exemplary embodiment, the one or more reports may include data for one or more customers 140, one or more claims 150, or any combination thereof. Additionally and/or alternatively, the one or more reports may include information reflecting, for example, one or more average values, one or more customer average values, one or more standard deviations, status of one or more customers 140, status of one or more claims 150, etc. Claim management computing system 110 may generate the one or more reports automatically, on demand, or any combination thereof. For example, claim management computing system 110 may generate the one or more reports on a regular basis, such as, for example, monthly, bimonthly, weekly, bi-weekly, daily, etc.

INDUSTRIAL APPLICABILITY

The disclosed embodiments may be implemented with automated processing of any type of claim. The disclosed embodiments may achieve improved processing of claims, including improved feedback to customer. In particular, the disclosed embodiments may analyze, identify, and/or assess customers for process improvement and provide information to those customers on achieving improvement. For example, by improving performance of one or more outlying customers, the disclosed embodiments may reduce overall costs and streamline claims processing.

Further, the disclosed embodiments are not limited to processes between a customer and a product distributor. For example, the disclosed embodiments may be applicable to goods other than products, such as, retail items, wholesale items, consumer goods, and/or services. In addition, the disclosed embodiments may be used within a business entity. The business entity may include divisions, groups, etc. that interact as sub-entities for the business entity. The sub-entities may act as a user of a good supplied by a supplier sub-entity within the same business entity, such as a manufacturing business with supply division, production line division, etc.

It will be apparent to those skilled in the art that various modifications and variations can be made in the automated processing of claims. It is intended that the specification and examples be considered as exemplary only, with a true scope of the disclosed embodiments being indicated by the following claims and their equivalents.

What is claimed is:

1. A computer-implement method for processing claims, comprising:
    calculating, by a processor associated with a computer, a customer average value for each of a plurality of customers;
    calculating, by the processor, a group average value;
    calculating, by the processor, a plurality of values based on the group average value;
    identifying, at the processor, one of the plurality of values as a threshold value;
    receiving, at the processor, a claim from a customer;
    determining, by the processor, if a customer average value associated with the customer is greater than or equal to a threshold value;
    processing, by the processor, the claim when the customer average value is less than the threshold value;
    determining, by the processor, if the claim meets one or more predetermined parameters when the customer average value is greater than or equal to the threshold value;
    processing, by the processor, the claim when the claim meets the one or more predetermined parameters; and
    forwarding, by the processor, the claim for further investigation when the claim fails to meet the one or more predetermined parameters and the customer average value is greater than or equal to the threshold value.

2. The computer-implement method as in claim 1, further including:
    calculating a standard deviation based on the group average value.

3. The computer-implement method as in claim 2, wherein the threshold value is based on the standard deviation.

4. The computer-implement method as in claim 1, wherein forwarding the claim further includes:
    denying the claim.

5. The computer-implement method as in claim 1, wherein forwarding the claim further includes:
    reviewing one or more processes associated with the customer;
    determining an improvement plan associated with the customer; and
    monitoring the improvement plan.

6. The computer-implement method as in claim 5, further including:
    calculating a new group average value associated with the group of customers;
    calculating a new customer average value associated with the customer; and calculating a new standard deviation based on the new group average value.

7. The computer-implement method as in claim 1, wherein the group average value is a mean average value.

8. A computer-readable medium including instructions for performing a method, when executed by a processor, for processing dealer returns, comprising:
    calculating, by a processor associated with a computer, a customer average value for each of a plurality of customers;
    calculating, by the processor, a group average value;
    calculating, by the processor, a plurality of values based on the group average value;
    identifying, at the processor, one of the plurality of values as a threshold value;
    receiving, at the processor, a claim from a customer;
    determining, by the processor, if a customer average value associated with the customer is greater than or equal to a threshold value;
    processing, by the processor, the claim when the customer average value is less than the threshold value;
    determining, by the processor, if the claim meets one or more predetermined parameters when the customer average value is greater than or equal to the threshold value;
    processing, by the processor, the claim when the claim meets the one or more predetermined parameters; and
    forwarding, by the processor, the claim for further investigation when the claim fails to meet the one or more predetermined parameters and the customer average value is greater than or equal to the threshold value.

9. The computer-readable medium of claim 8, further including:
    calculating a standard deviation based on the group average value.

10. The computer-readable medium of claim 9, wherein the threshold value is based on the standard deviation.

11. The computer-readable medium of claim 10, wherein the group average value is a mean average value.

12. The computer-readable medium of claim 8, wherein forwarding the claim further includes:
    denying the claim.

13. The computer-readable medium of claim 8, wherein forwarding the claim further includes:
    reviewing one or more processes associated with the customer;
    determining an improvement plan associated with the customer; and
    monitoring the improvement plan.

14. The computer-readable medium of claim 13, further including:
    calculating a new group average value associated with the group of customers;
    calculating a new customer average value associated with the customer; and
    calculating a new standard deviation based on the new group average value.

15. A computer-implemented method for processing claims, comprising:
    calculating, by a processor associated with a computer, a customer average value for each of a plurality of customers;
    calculating, by the processor, a group average value;
    calculating, by the processor, a plurality of values based on the group average value;
    identifying, at the processor, one of the plurality of values as a threshold value;
    receiving, at the processor, a claim from a customer, wherein the customer has an associated customer average value;
    determining, by the processor, if the customer average value is greater than or equal to a threshold value, wherein the threshold value is based on a group average value associated with a group of customers, and wherein the customer is included in the group of customers; and
    processing, by the processor, the claim when the customer average value is less than the threshold value.

16. The computer-implemented method as in claim 15, further including:
    calculating a standard deviation based on the group average value, wherein the threshold value is based on the standard deviation.

17. The computer-implemented method as in claim 15, further including:
    determining if the claim meets one or more predetermined parameters when the customer average value is greater than or equal to the threshold value;
    processing the claim when the claim meets the one or more predetermined parameters; and
    forwarding the claim for further investigation when the claim fails to meet the one or more predetermined parameters and the customer average value is greater than or equal to the threshold value.

* * * * *

UNITED STATES PATENT AND TRADEMARK OFFICE
CERTIFICATE OF CORRECTION

| | |
|---|---|
| PATENT NO. | : 8,150,722 B2 |
| APPLICATION NO. | : 11/882276 |
| DATED | : April 3, 2012 |
| INVENTOR(S) | : Meyer et al. |

It is certified that error appears in the above-identified patent and that said Letters Patent is hereby corrected as shown below:

In the Specification,

Column 2, line 49, delete "claim management computing system 100," and insert -- claim management computing system 110, --.

Column 11, line 54, delete "bimonthly," and insert -- bi-monthly, --.

Signed and Sealed this
Eighteenth Day of August, 2015

Michelle K. Lee
*Director of the United States Patent and Trademark Office*